Patented June 16, 1953

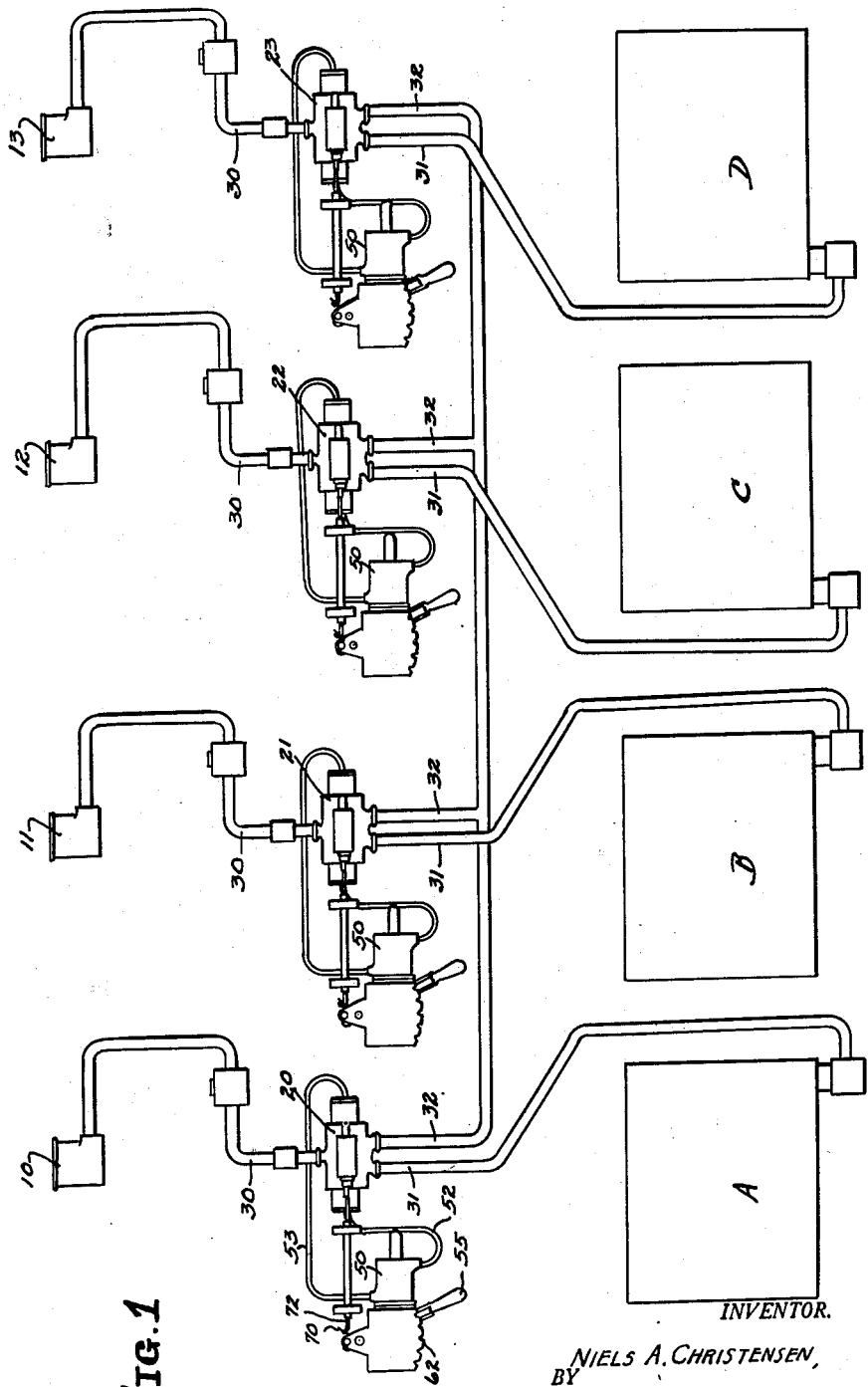

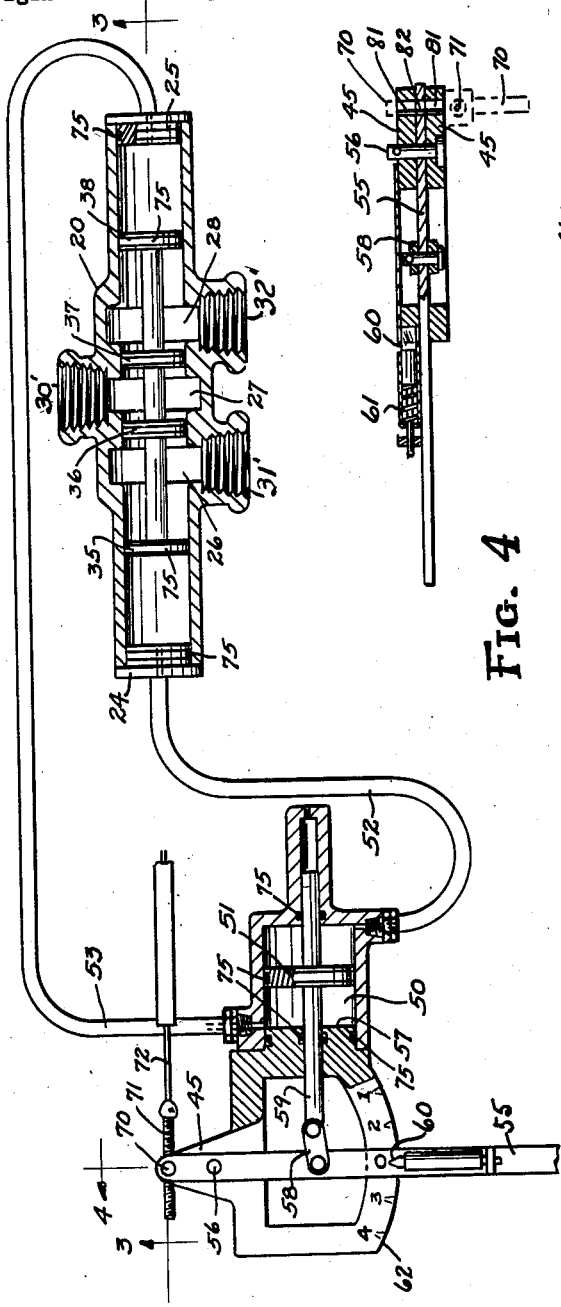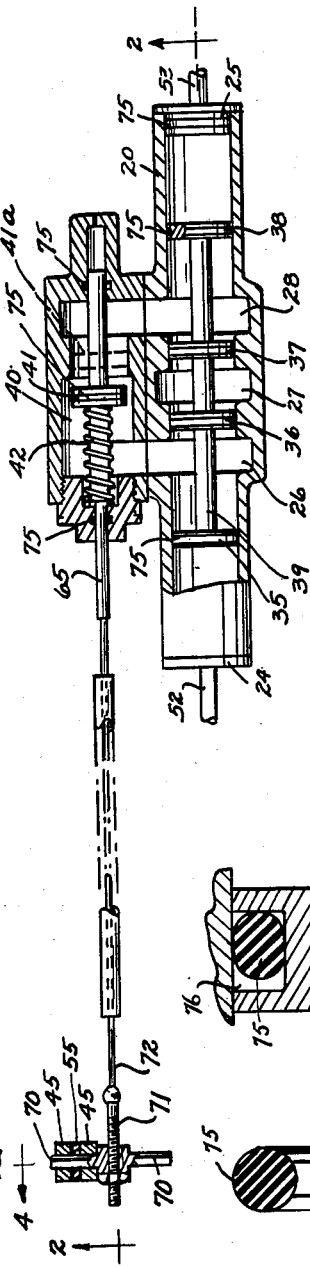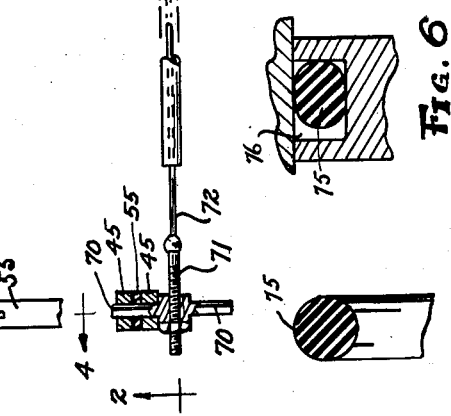

2,642,087

UNITED STATES PATENT OFFICE 2,642,087

VALVE MECHANISM

Niels A. Christensen, South Euclid, Ohio

Original application July 14, 1943, Serial No. 494,749, now Patent No. 2,501,661, dated March 28, 1950. Divided and this application February 20, 1948, Serial No. 9,889

7 Claims. (Cl. 137—637)

This application is a division of my pending application Ser. No. 494,749, filed July 14, 1943, now Patent No. 2,501,661 issued March 28, 1950, for an Apparatus and System for Fluid Control. That application sets out a system and apparatus for selectively controlling the flow of liquid from a plurality of sources into one or more of a plurality of devices which normally use liquid in the operation thereof, such, for example, as an airplane. The present invention is concerned with the valve mechanism itself, which may be efficiently used in such a system as well as in other installations, and the object of this invention is to provide such a valve mechanism in a simple and efficient form which shall be readily operable to accomplish the coupling of conduits as desired and shall not be liable to leakage within the valve mechanism.

In regard to the desirability of using such valve mechanism as herein disclosed, it may be noted that in modern airplane design it is customary to use a plurality of tanks for one or more motors and to draw fuel from the tanks progressively as it is consumed on an extensive flight. In combat work, however, where the liability is present of sudden damage to one or more engines, or to one or more fuel supply tanks, there is great need for a system by means of which fuel may be supplied by any individual or combination of tanks and delivered to any individual or combination of engines. At the present time the fuel tanks are usually located at a point quite remote from the operator and the selector valves controlling the flow of fuel are located at points remote from the pilot, wherefore, dependence must be placed upon other members of the crew to operate the valves in case of emergency. An additional problem in such work has been the difficulty of maintaining a satisfactory leakproof joint at the valves.

In the drawings, Fig. 1 is a diagrammatic view illustrating a typical layout for selectively controlling the flow of fluid to a four-motored airplane, wherein supply tanks are utilized for containing the fuel; Fig. 2 is an assembly diagram partly in section and illustrating some of the features of the control equipment in greater detail than shown in Fig. 1; Fig. 3 is a section taken on the plane indicated by the line 3—3 in Fig. 2, and Fig. 4 is a section taken on the plane indicated by the line 4—4 in Fig. 2; Fig. 5 is a section taken on a larger scale than that shown on Fig. 2, illustrating the sealing ring used in the valve; Fig. 6 is a fragmentary section of one of the valve pistons and the adjacent cylinder wall showing the sealing ring in its condition of use.

Referring first to Fig. 1, to illustrate the utility of the valve in coupling various conduits, I have shown four sources of fuel supply designated by tanks A, B, C and D, respectively, while the devices which utilize the liquid contained in the tanks are indicated as engines 10, 11, 12 and 13, respectively. Each tank is connected to one of the engines, and between each tank and engine, I provide a selector with valve mechanism which may be selectively operated at a remote point for permitting the operation of each engine by fuel from its associated tank, or from any other tank. Additionally, the valve mechanism may be so operated that the fuel from any tank may be replenished by that in any other tank.

In the illustration of Fig. 1, which comprises a four-motored system, the various selector valves for the respective engine and tank units are designated in general at 20, 21, 22 and 23, respectively. These selectors are identical in construction and are shown in greater detail in Figs. 2 and 3, and each has provision for connecting the conduits that lead respectively to its associated tank and engine, and to the other selector valves. Thus, for example, selector 20 has a conduit 30 connecting it to the engine 10, a conduit 31 connecting it to the tank A, and a manifold conduit 32 connecting it to the other selectors 21, 22 and 23, respectively. The same numerals are used for designating corresponding conduits leading from the chambers 21, 22 and 23, to their respective engines and tanks.

Referring now to Fig. 2, which shows my valve mechanism in section, the selector valve, which for example may be the one designated 20, embodies a cylinder having end walls 24 and 25 and having enlarged portions 26, 27 and 28 respectively in the region of the internally threaded lateral extensions 31', 30' and 32', which are adapted to receive the conduits 31, 30 and 32 respectively. A valve unit is disposed within the chamber and comprises a plurality of pistons indicated at 35, 36, 37, and 38 as being rigidly mounted upon a piston rod 39. The rod terminates at the end pistons 35 and 38, and the pistons are so spaced upon the rod that movement thereof as a unit within the chamber will direct the flow of liquid therein in a predetermined manner, as will hereinafter be set forth.

Each selector valve for a multiple-motored plane has an auxiliary selector, preferably in the nature of a by-pass conduit as a part thereof as is illustrated in Fig. 3, at 40. Such auxiliary selector is used only in multi-engined planes and then only when the engine with which it is associated is stopped or out of commission, at which time the auxiliary selector valve is preferably interlocked with the means for controlling the main selector valve, as will hereinafter be set forth in detail, in which position flow of liquid is permitted from the tank normally used for the inactive engine and is directly connected with the manifold conduit 32, whereby such liquid is then available for use by the other engines, or for transference to other tanks, as desired.

The auxiliary selector preferably embodies a cylinder 40 (Fig. 3), the ends of which are in direct communication with the recesses 26 and 28 of the selector 20. A piston 41 serves to control the flow of liquid through the by-pass and in the form shown in Fig. 3, the piston is in the open position and is held in such condition against the influence of a spring 42 which normally tends to move it to the closed position as shown by the broken lines 41a. The housing for the by-pass conduit may be attached to the side of the casting which forms the selector 20 in any suitable way.

Referring again to Fig. 2, the mechanism for remotely controlling the position of the valve assembly in the selector 20 may be called a servomotor and preferably comprises a pilot cylinder 50, in which a piston 51 is mounted for manual reciprocation. One end of the cylinder is connected by a conduit 52 to one end of the selector 20 through an opening in the wall 24, while the other end of the cylinder is connected as by conduit 53 to the opposite end of the selector 20 through an opening in the wall 25. The space then between the outer faces of pistons 35 and 36, as well as the conduits 52 and 53, and all of the available space within the cylinder 50 are filled with a non-compressible fluid, such as oil, wherefore, any reciprocation of the piston 51 effects a simultaneous movement of the piston assembly in the selector 20. The sizes of the various parts are so chosen that within the limits of movement of the piston 51, the valve assembly in the selector 20 can be moved to distribute the flow of liquid.

A convenient arrangement for moving the piston 51 selectively embodies a hand lever 55 which is pivotally mounted at 56 on a bracket which may form an extension of the end wall 57 of the cylinder 50. The lever may be connected through a link 58 to the piston rod 59, while an indexing plunger 60, carried by the lever, may be urged by a spring 61 into engagement with spaced indentations on the periphery of the bracket sector 62. Such indentations may be designated as 1, 2, 0, 3, and 4, respectively, the "0" position constituting the "off" position, as shown in Fig. 2.

Normally, as previously stated, the by-pass associated with each selector is held in closed position, such as is shown in broken lines 41a in Fig. 3. When, however, it is desired to open the by-pass so as to permit the flow of fuel, either from one of the tanks into the manifold line, or vice versa, then the rod 65 on which the piston 41 is mounted is moved axially against the force of the spring 42 until the piston 41 comes to a stop by a shoulder on the piston stem and clears the wall of its cylinder, at which time fuel may flow through the by-pass conduit in either direction desired.

Whenever the by-pass conduit is open, it is desirable that the engine associated therewith be shut off, at which time the lever 55 will be in "0" or central position shown in Fig. 2. Accordingly, to hold the by-pass valve in open position, I have shown a holding device in the form of a pin 70 which is adapted to be inserted through registering openings 81 and 82 in the bracket arm 45 and lever 55, respectively. The pin 70 may have a threaded passageway extending therethrough for receiving a threaded rod 71 which in turn is connected to the piston rod 65 by a flexible cord or wire 72. Such arrangement not only holds the by-pass valve in open position, but also locks the engine control valve in off position, the handle of which cannot be moved until the pin 70 has been pulled out.

To prevent the escape of liquid past any of the pistons used herein and at the same time to permit movement of the pistons beyond the sealing portion of the cylinder, and permit withdrawal into such portion without damaging the sealing material, I prefer to utilize a resilient ring 75 of circular cross-section, as shown in Fig. 5, mounted in piston grooves 76, or within corresponding grooves in the end walls of the respective cylinders. The depth of each groove is such that when the parts are assembled, the ring is forced to assume an ellipsoidal shape, as shown in Fig. 6, but the width of the groove is greater than the longest cross-sectional dimension of the deformed ring so as to permit slight movement of the ring back and forth in the groove whenever the piston is moved. Such action tends to knead the material of which the ring is made and thereby to keep it alive. Moreover, since each piston is narrower than the width of the recess in the cylinder, each piston may move back and forth without affecting the ability of the ring to maintain a good seal.

While I have illustrated the system as applied to a multi-motored plane, nevertheless, the selector unit is applicable for use in a single-motored plane where a plurality of tanks are used as the source of supply, in which case the opening which normally communicates with the manifold conduit 32 would communicate with the auxiliary tank or with another tank that is used as a source of supply. In such installations, the by-pass conduit and its associated valve mechanism may be eliminated, such as by closing off the openings leading thereto by means of a plate. The main selector valve, therefore, operates to permit fuel to be supplied to the engine from one or both tanks, as desired.

I claim:

1. In a valve mechanism, the combination of a cylinder having three recesses therein arranged in a row and each communicating with the exterior, a multiple piston member in the cylinder having two pistons adapted to stand respectively between the first recess and the second recess and between the second recess and the third recess, and having two end pistons respectively beyond the first and third recesses, means for forcing operating fluid into the end portions of the cylinder to operate the piston member, means providing a chamber communicating with the first and third recesses and having a valve seat between the regions of such communication, a valve member adapted to open and close communication through the valve seat, a spring tending to maintain the valve member seated, and means serving the double purpose of holding the valve open and locking in neutral position the means for forcing operating fluid to the cylinder.

2. The combination of a cylinder having two intake orifices and an exit orifice, a piston member within the cylinder adapted by its position to couple either intake orifice with the exit orifice or to admit fluid from both intake orifices to the cylinder while closing the exit orifice, means for moving said piston member to different operating positions, a chamber external to the cylinder and in communication with both intake orifices, a valve seat in the chamber between the regions of such communication, a valve member normally seated on said seat, and means serving the double purpose of holding the valve unseated and locking in neutral position the means for moving said piston member.

3. The combination of a cylinder having two intake orifices and an intermediately located exit orifice, a piston member within the cylinder having a pair of pistons adapted to couple either intake orifice with the exit orifice or to admit fluid from both intake orifices to the cylinder while closing the exit orifice, means for moving said piston member axially, a chamber external to the cylinder and in communication with the interior of said cylinder on the outer sides of said pistons when the pistons are in position to close the exit orifice, a valve seat in the chamber between the regions of such communication, a valve member normally seated on said seat, and means serving the double purpose of holding the valve unseated and locking in neutral position the means for moving said piston member.

4. In a valve mechanism, the combination of a cylinder having three recesses arranged at axially spaced intervals therein, a multiple piston member movable in said cylinder, said member including two axially spaced pistons adapted to stand simultaneously one between the intermediate recess and one of the extreme recesses and the other between the intermediate recess and the other extreme recess, each of said last-mentioned pistons being narrower than the width of any of said recesses and the spacing between the centers of such pistons corresponding substantially to that between the center of the intermediate recess and the center of either extreme recess, and means for axially moving the two pistons as a unit.

5. In a valve mechanism, the combination of a cylinder having three recesses arranged at axially spaced intervals therein, a multiple piston member slidable in said cylinder, said member including two extreme pistons disposed beyond the ends of the corresponding outermost recesses and two axially spaced intermediate pistons adapted to stand simultaneously one between the intermediate recess and one of the extreme recesses and the other between the intermediate recess and the other extreme recess, each of said last-mentioned pistons being narrower than the width of any of said recesses and the spacing between the centers of such intermediate pistons corresponding substantially to that between the center of the second recess and the center of either extreme recess, and means for forcing fluid to either end of the cylinder to act on the corresponding end piston to operate the piston member axially sufficiently to carry the intermediate pistons into intermediate regions of two of said recesses.

6. In a valve mechanism, the combination of a cylinder having three annular recesses arranged in a row in its wall, means for attachment of three conduits communicating with the respective recesses, a multiple piston member in the cylinder having two axially spaced pistons adapted to stand respectively between the intermediate recess and a different one of the extreme recesses, each of said pistons being narrower than any of any of said recesses and the spacing between the centers of such pistons corresponding substantially to that between the center of the second recess and the center of either extreme recess, said piston member having two end pistons within the cylinder each beyond the adjacent extreme recess, said piston member being capable of axial movement in the cylinder to bring either of the intermediate pistons into registration with the intermediate recess, and the other intermediate piston into registration with an extreme recess, and means for conducting operating fluid into end portions of the cylinder beyond the end pistons for operating the piston member.

7. In a valve mechanism, the combination of a cylinder having three recesses in the wall thereof arranged in a row, three separate external conduits respectively communicating with said recesses, a multiple piston member in the cylinder having two pistons adapted to engage the cylinder wall and stand one between the first and second recesses and the other between the second and third recesses, a casing alongside of the cylinder providing a chamber communicating directly with the first and third recesses and having a valve seat between the regions of such communication, a valve member adapted to open and close communication through the valve seat whereby when the valve member is unseated the two conduits connected to the extreme recesses are coupled together, and means for moving said piston member axially of the cylinder to establish communication between said second recess and one of the other recesses.

NIELS A. CHRISTENSEN.

References Cited in the file of this patent

UNITED STATES PATENTS

| Number | Name | Date |
|---|---|---|
| 331,789 | Harvey | Dec. 8, 1885 |
| 391,597 | Ellithorpe | Oct. 23, 1888 |
| 519,639 | Matthews | Mar. 8, 1894 |
| 1,394,615 | Erwin | Oct. 25, 1921 |
| 1,417,770 | Schaefer | May 30, 1922 |
| 1,861,818 | Rossman | June 7, 1932 |
| 2,314,683 | Berry | Mar. 23, 1943 |